Aug. 12, 1969 V. M. MALTABAR ET AL 3,460,949
METHOD OF DISTILLING WINE TO PRODUCE BRANDY SPIRIT
Filed May 17, 1965
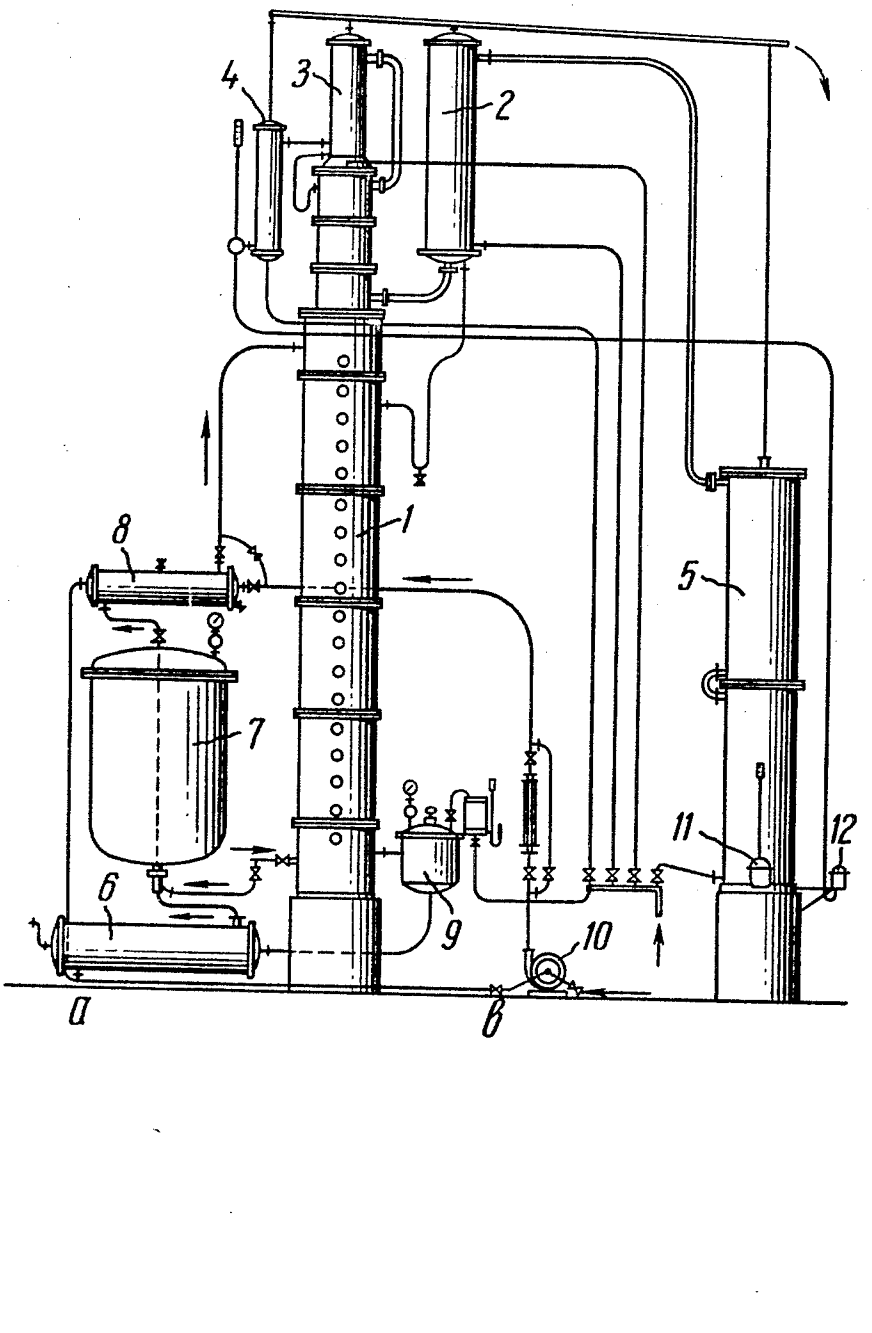

United States Patent Office 3,460,949
Patented Aug. 12, 1969

3,460,949
METHOD OF DISTILLING WINE TO PRODUCE BRANDY SPIRIT

Vasily Markovich Maltabar, Mikhail Georgievich Uljankin, and Vladislav Vladimirovich Andreev, Kishinev, U.S.S.R., assignors to Moldavsky Nauchno-Issledovatelsky Institute Pishchevoi Promyshlennosti, Kishinev, U.S.S.R.

Filed May 17, 1965, Ser. No. 456,110
Int. Cl. C12f *3/06;* C12g *3/12*
U.S. Cl. 99—34 3 Claims

ABSTRACT OF THE DISCLOSURE

In order to reduce the time required for distilling wine to produce brandy, wine is preheated to a temperature of 90–95° C., superheated with pressurized live steam to a temperature of about 105° C. and cooled before distillation thereof.

This invention relates to the production of brandy spirit and more particularly, to a method comprising heat treating wine for brandy spirit production, as well as to an apparatus for performing of said method.

A method is known for the heat treatment of wine for brandy spirit production, which comprises in preheating the wine to 90–100° C. and maintaining it at this temperature for approximately 20 hours, said method being effected in continuous units for brandy spirit production, including a column still, dephlegmators, condensers and a heater.

However the known method is time consuming, and the continuous unit for brandy spirit production suffers from the disadvantage of requiring bulky containers for holding the wine which has been heated to a temperature of 90–100° C.

It is an object of the present invention to reduce the time of heat treatment of wine for brandy spirit production.

It is another object of the invention to simplify the design of the unit.

These objects are achieved by subjecting preheated wine to superheating with live steam for a short period of time, preferably at a temperature of 105° C., with subsequent cooling.

To accomplish the method of the present invention a continuous unit for brandy spirit production is furnished with a superheater and a cooler.

The provision of a superheater and a cooler obviates the need for bulky containers for holding wine at a temperature of 90–100° C. for a period of 20 hours.

Other objects and advantages of the present invention will be apparent from the following description and the accompanying drawing which shows a continuous unit for brandy spirit production said unit comprising an arrangement for accomplishing the method of this invention.

As stated above, live steam is introduced into the wine, thus dispensing with the use of heat transfer surfaces and preventing nonvolatile constituents from being burnt.

The unit comprises distillation column 1 with twenty-four bubble-cap plates, dephlegmator 2 for the brandy spirit fraction, dephlegmator 3 for the heads, condenser 4 for the heads, condenser 5 for the brandy spirit, wine heater 6, wine superheater 7, cooler 8, stillage bottoms regulator 9, wine feed pump 10 and test bowls 11 and 12.

The procedure for producing brandy spirit in the continuous unit is disclosed below.

Steam is introduced into the lower part of column 1 through a bubbler. The wine to be distilled is fed by pump 10 through cooler (heat exchanger) 8 to heater 6. In cooler (heat exchanger) 8 the wine is heated by the wine coming from superheater 7, and serves as a heat-transfer agent. In heater 6 the wine is further heated, the heat-transfer agent being the stillage bottoms. The ultimate temperature of the wine leaving heater 6 is 90–95° C. It then enters superheater 7 where it is treated with live steam. The entire heat treatment of the wine lasts 1.5 hours.

The amount of live steam at a pressure of 5 atm. used for additional heating the wine is less than 5% by weight of the wine.

Heater 6 and superheater 7 operate under a pressure of 0.5–0.7 atm., which is maintained by means of a reducing valve mounted on superheater 7.

From superheater 7 the wine is fed at a temperature of 105° C. to cooler 8 where it is cooled to 90° C. by the counter-flow of stock wine. The wine then flows onto one of the feed plates of column 1. The water-alcohol vapor of the brandy spirit fraction passes into dephlegmator 2, from whence it enters condenser 5, and the condensate obtained flows through test bowl 11 into the receiver. The water-alcohol vapor of the heads from the upper plates of the column is fed consecutively into dephlegmator 3 and condenser 4, from whence the condensate flows through test bowl 12 into the appropriate receiver. The upper plates of column 1 are cooled with reflux from dephlegmators 2 and 3.

While the present invention has been described with reference to the preferred mode of embodiment, it will be understood by those skilled in the art that there may be changes and modifications of the invention without departing from the spirit and scope thereof as described hereinabove and defined in the appended claims.

What we claim is:

1. A method of heat treating wine to produce brandy spirit, said method comprising preheating a wine to a temperature of 90–95° C., superheating the preheated wine to a temperature of about 105° C. with live steam under pressure, cooling the superheated wine and distilling same to produce brandy spirit.

2. A method as claimed in claim 1, wherein superheating is effected with about 5% by weight of live steam based on the weight of wine.

3. A method as claimed in claim 2, wherein the live steam is at a pressure of about 5 atmospheres.

References Cited

UNITED STATES PATENTS 2,868,645 1/1959 Neureuther ---------- 99—34

LIONEL M. SHAPIRO, Primary Examiner

D. M. NAFF, Assistant Examiner

U.S. Cl. X.R.

99—35